US00RE47637E

(19) United States
(12) Reissued Patent
Winarski

(10) Patent Number: US RE47,637 E
(45) Date of Reissued Patent: Oct. 8, 2019

(54) SMART LASER DEVICE

(71) Applicant: Tyson York Winarski, Mountain View, CA (US)

(72) Inventor: Tyson York Winarski, Mountain View, CA (US)

(21) Appl. No.: 15/728,468

(22) Filed: Oct. 9, 2017

Related U.S. Patent Documents

Reissue of:
(64) Patent No.: 9,668,322
Issued: May 30, 2017
Appl. No.: 15/081,045
Filed: Mar. 25, 2016

(51) Int. Cl.
*H05B 37/02* (2006.01)
*G01S 17/08* (2006.01)
(Continued)

(52) U.S. Cl.
CPC ..... *G01S 17/08* (2013.01); *G01C 15/002* (2013.01); *G01S 17/58* (2013.01); *G01S 17/88* (2013.01); *H04W 4/80* (2018.02)

(58) Field of Classification Search
CPC ..... G01C 9/02; G01S 7/495; G01S 17/08
See application file for complete search history.

(56) References Cited

U.S. PATENT DOCUMENTS 5,123,327 A * 6/1992 Alston ..... F41H 7/00 89/1.813
5,612,883 A * 3/1997 Shaffer ..... B60K 31/0008 340/435

(Continued)

*Primary Examiner* — Angela M Lie
(74) *Attorney, Agent, or Firm* — The Winarski Firm, PLLC

(57) ABSTRACT

A smart laser pointer is disclosed in this application that includes a laser coupled to a processor that can disable the laser from operating for a period of time (T) based on a disabling trigger. The smart laser pointer may also include an optical receiver coupled to the processor that detects received laser signals that are emitted from the laser after they are reflected off of a target and a memory storing position information threshold limits. The processor calculates measured position information based on the received laser signals detected by the optical receiver and compares them to the position information threshold limits. A disabling trigger occurs when the position information exceeds the position information threshold limits. The position information and threshold limits may include a distance or a velocity. These threshold limits are provided to ensure that the smart laser pointer cannot be used to target distant fast moving aerial targets such as commercial aircraft or helicopters, but still operate in legitimate contexts such as a conference room with a target such as a display screen that is stationary and close to the smart laser pointer. The smart laser pointer can include a unique identifier that is encoded on a signal emitted by the laser to enable a third party law enforcement agency to determine the exact laser pointer that is emitting the signal. The smart laser pointer may include a GPS chip to determine its exact geographic location. This geographic location information is encoded on a signal emitted by the laser to enable a third party law enforcement agency to determine the exact location of the laser pointer that is emitting the signal. The smart laser pen may include a blue tooth antenna to enable it to communicate with a mobile application on a mobile device. The mobile application is configured to receive text messages from law enforcement that instruct the mobile application to transmit a disabling signal to the smart laser pen to shut down the laser and prevent it from operating. The smart laser pen may also include an RF antenna that can receive a disabling command to shut down the laser and prevent it from operating. These features allow law enforcement to identify, locate, and shut down the operation of the smart laser pen, thereby enhancing aircraft safety.

24 Claims, 12 Drawing Sheets

(51) Int. Cl.

| | |
|---|---|
| ***G01S 7/495*** | (2006.01) |
| ***G01C 9/02*** | (2006.01) |
| ***H04W 4/00*** | (2018.01) |
| ***G01S 17/88*** | (2006.01) |
| ***G01C 15/00*** | (2006.01) |
| ***G01S 17/58*** | (2006.01) |
| *H04W 4/80* | (2018.01) |

(56) References Cited

U.S. PATENT DOCUMENTS 5,767,954 A * 6/1998 Laakmann ..... G01P 3/36 180/167
5,788,110 A * 8/1998 Alhamad ..... A62C 3/0257 342/4
7,389,929 B2 * 6/2008 Havens ..... G06K 7/10584 235/454
7,652,573 B2 * 1/2010 Donat ..... G07C 9/00111 340/539.32
8,269,612 B2 * 9/2012 Horky ..... G08C 17/02 340/12.22
8,492,701 B2 * 7/2013 Nobis ..... G01B 11/2755 250/221
9,374,990 B2 * 6/2016 Bolen ..... A01M 1/02
9,494,480 B2 * 11/2016 Klicpera ..... G01M 3/00
9,519,003 B1 * 12/2016 Okur ..... G01P 3/38
2003/0206286 A1 * 11/2003 Bogh-Andersen ..... G01S 7/483 356/28.5
2008/0285017 A1 * 11/2008 Mitchell ..... A61B 18/22 356/73.1
2011/0144829 A1 * 6/2011 Kim ..... A01M 29/10 701/2
2012/0098693 A1 * 4/2012 Bradley ..... G06F 21/6209 342/14
2013/0301046 A1 * 11/2013 Lipson ..... G01J 1/32 356/326
2015/0092183 A1 * 4/2015 Dumoulin ..... G01C 15/004 356/4.07
2016/0364866 A1 * 12/2016 Sampigethaya ..... G06T 7/73
2017/0027156 A1 * 2/2017 Henskes ..... A01M 29/10

* cited by examiner

| THRESHOLD DATA BLOCK 280 | MAX HORIZONTAL (L-MAX) 290 | MAX VERTICAL (H-MAX) 300 | MAX VELOCITY (V-MAX) 310 | MAX DISTANCE (D-MAX) 320 |
|---|---|---|---|---|
| THESHHOLD LIMITS 330 | 200 FT. | 75 FT. | 50 MPH | 225 FT. |

FIG. 5

SMART LASER DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Aiming a laser at an aircraft is a serious safety risk and violates federal law. Many high-powered lasers can completely incapacitate pilots who are trying to fly safely to their destinations with hundreds of passengers. The Federal Aviation Administration is working with federal, state, and local law enforcement agencies to pursue civil and criminal penalties against individuals who purposely aim a laser at an aircraft. The potential that terrorists could seek to disrupt air travel through the use of lasers is real.

Federal Aviation Administration researchers have compiled a database containing more than 3,000 reports of aircraft laser illumination events over a 20-year period. These reports describe the illumination of military and civilian aircraft by lasers, including law enforcement and medical evacuation flights. No accidents have been attributed to the illumination of crewmembers by lasers, but given the sizeable number of reports and debilitating effects that can accompany such events, the potential does exist. On December 2013 a commercial airline pilot and copilot averted a disaster by landing an airplane safely at Palm Beach International Airport after a blinding laser was pointed at the cockpit from the ground, according to the Palm Beach County, Fla., Sheriff's Office. On Dec. 26, 2013, a commercial flight approached New York's John F. Kennedy International Airport. The pilot of that plane was temporarily blinded by a laser and experienced blurry vision for a week following the incident. On Mar. 21, 2013, a 27-year-old man pointed a bright green laser at the pilot of a Columbus, Ohio, Division of Police helicopter. The prosecutor stated at sentencing that "the blinding effect when the laser beam came through the helicopter's windshield could have caused a crash in a heavily populated residential area." The subject stated that he pointed the laser because he was bored. He was sentenced to 45 days in jail plus 18 months probation. The security-council chair for the Airline Pilots Association has been struck by lasers on five separate occasions during his career. The most serious of the laser strikes occurred 45 seconds prior to landing a CJR-700 aircraft with 67 passengers and four crew members on board in 2011. The captain reported temporary blindness and disorientation.

Sudden exposure to laser radiation during a critical phase of flight, such as on approach to landing or departure, can distract or disorient a pilot and cause temporary visual impairment. Permanent ocular damage is unlikely since the majority of incidents are brief and the eye's blink response further limits exposure. In addition, considerable distances are often involved, and atmospheric attenuation dissipates much of the radiant energy.

Although lasers have many legitimate outdoor uses, such as in astronomical research, deep-space communications, orbital satellite imaging, and outdoor displays to attract and entertain the public, the misuse of laser devices poses a serious threat to aviation safety. Aviators are particularly vulnerable to laser illuminations when conducting low-level flight operations at night. The irresponsible or malicious use of laser devices can threaten the lives of flight crews and passengers.

FAA flight simulator studies, however, have shown the adverse visual effects from laser exposure are especially debilitating when the eyes are adapted to the low-light level of a cockpit at night. Similar to a camera flash at close proximity or the high-beam headlights of an oncoming car, recovering optimal visual performance after exposure to laser light may take from a few seconds to several minutes. Besides startle and distraction, the three most commonly reported physiological effects associated with laser exposures are: Glare—Obscuration of an object in a person's field of vision due to a bright light source located near the same line of sight; Flashblindness—A visual interference effect that persists after the source of illumination has been removed; and Afterimage—A transient image left in the visual field after an exposure to a bright light.

Laser activity in navigable airspace is continually monitored to better define the nature of the threat from outdoor lasers. The number of laser events increased over 300% from 2005 to 2008. This increase may be due to heightened awareness of the problem by flight crewmembers, the introduction of an authorized reporting process, and the increased availability of high-output, handheld laser devices. Once only marketed as "laser pointers" and used for pointing out topics of interest in slide presentations with output power from 1 to 5 mW, handheld laser devices can now be purchased over the Internet with output power as high as 500 mW. While the Food and Drug Administration prohibits the sale of "laser pointers" that exceed 5 mW, it does not prohibit the sale of more powerful, handheld lasers, if they are equipped with the appropriate labels and safety mechanisms.

The latest reports indicate that aircraft illuminations by handheld lasers are primarily green (91%) in color, as opposed to red (6.3%), which was more common a few years ago. This is significant because the wavelength of most green lasers (532 nm) is close to the eye's peak sensitivity when they are dark-adapted. A green laser may appear as much as 35 times brighter than a red laser of equal power output. Due to this heightened visibility and increased likelihood of adverse visual effects, illumination by green lasers may result in more events being reported.

Illumination reports often describe several types of adverse effects. These include visual effects (8.2%), pain and/or possible injury (1.6%), and operational problems (3.2%). Operational problems include momentary distraction, disorientation resulting in another pilot assuming control, aborted landings, loss of depth perception, and shutting down of runways due to multiple laser strikes. While only 16.5% of all cockpit illuminations occurred below 2,000 feet (Laser-Free Zone), these incidents accounted for 31% of all visual effects, 42% of all pain or injuries, and 42% of all operational problems reported. Low-attitude illuminations, therefore, result in a greater risk to aviation safety.

Studies have also shown that almost 70% of all incidents occurred between 2,000 and 10,000 feet AGL, 22% occurred in November and December, and 70% happened between the hours of 7 and 11 pm. There is a real and urgent need to develop technologies that could prevent the ability for laser devices to be used by criminal or terrorist elements to promote aviation safety.

SUMMARY

A laser device is disclosed that includes a laser coupled to a processor that can disable the laser from operating for a period of time (T) based on a disabling trigger. The laser device may also include an optical receiver coupled to the processor. The optical receiver detects received laser signals that are emitted from said laser after they are reflected off of a target. The laser device may also include a memory storing position information threshold limits. The processor calculates measured position information based on the received laser signals detected by the optical receiver. The processor compares the measured position information to the position information threshold limits. A disabling trigger occurs when the position information exceeds the position information threshold limits. The position information threshold limits may be a distance limitation where the measured position information is a measured distance and the disabling trigger occurs when the measured distance exceeds the distance limitation.

The laser device may also include a 3-axis accelerometer and gyroscope from which the processor can determine an angular position of the laser device with respect to Earth. With this 3-axis accelerometer and gyroscope, the processor can extract horizontal-length and vertical-distance information from the measured distance and angular position. The distance limitation could be a height limitation where the measured distance is a measured height calculated from the measured position information and the angular position. A disabling trigger occurs when the measured height exceeds said height limitation. The distance limitation could be a horizontal-length limitation where the measured distance is a measured horizontal-length calculated from the measured position information and the angular position. A disabling trigger occurs when the measured horizontal-length exceeds the horizontal-length limitation. In addition, the position information threshold limits could include a velocity limitation where the measured position information is a measured velocity. A disabling trigger occurs when the measured velocity exceeds the velocity limitation. These threshold limits are provided to ensure that the smart laser device cannot be used to target distant fast moving aerial targets such as commercial aircraft or helicopters, but still operate in legitimate contexts such as a conference room with a target such as a display screen that is stationary and close to the smart laser device. The differentiator here is that legitimate presentation targets such as projector screens in a conference room are close and stationary, thereby enabling the use of position threshold limitations to limit the operation of the laser if the target is too far or too fast, such as aircraft.

The laser device may also include an antenna coupled to the processor where the antenna receives a disabling signal from a third party containing a disabling trigger. Third parties may include law enforcement personnel. The laser device may further include an identifier embedded in the processor uniquely identifying the processor. The processor can modulate the laser to emit a signal containing the identifier, thereby allowing third parties to detect and identify the identifier from the emitted laser signal. A disabling signal can be transmitted to the laser device by third parties that includes the identifier, thereby allowing the third party to uniquely identify and shut down the laser device through the disabling signal. Thus, the laser device can be deactivated remotely by law enforcement personnel. The disabling signal may further include an encrypted instruction code directing said processor to disable the laser. The antenna may be an RF antenna.

The laser device may be wirelessly coupled to a mobile application on a mobile device. The mobile application is configured to communicate with the processor on the laser device through the laser device's antenna. In this embodiment, the antenna may be a blue tooth antenna. The processor enables the laser to function based upon an enabling trigger received by the processor through the blue tooth antenna transmitted from the mobile device under the direction of the mobile application. The enabling trigger includes a mobile telephone number associated with the mobile device. The processor modulates the laser to transmit the mobile telephone number so that third parties, such as law enforcement, can determine the mobile phone number of the mobile device coupled to the laser device from the emitted laser signal. A disabling trigger in this context is a disabling signal transmitted by the mobile device to the processor through the blue tooth antenna. The mobile app automatically directs the mobile device to transmit the disabling signal after the mobile device receives a text message from a third party, such as law enforcement containing an encrypted security code directing the mobile device to disable the laser.

The laser device may also include a GPS chip coupled to the processor. The GPS chip detects a precise geographic location of the laser device. The processor encodes said precise geographic location on a laser signal emitted by the laser to enable a third party, such as law enforcement to determine the location of the laser device based upon the laser signal.

The distance limitation may be set to a size configuration of a large conference room. The velocity limitation may be set of a velocity less than the speed of commercial aircraft during take-off or an approach and landing from an airport. The period of time (T) may be greater than 30 seconds to enable a commercial aircraft to travel a safe distance away from the laser device before the processor reactivates the laser to function. The period of time (T) may be greater than one minute to enable a commercial aircraft to travel a safe distance away from the laser device before the processor reactivates the laser to function. The period of time (T) may also be indefinite.

A laser device is disclosed that includes an optical receiver coupled to a processor. The optical receiver detects received laser signals that are emitted from the laser after they are reflected off of a target. The laser device also includes a 3-axis accelerometer and gyroscope from which the processor can determine an angular position of the laser device with respect to Earth. The laser device includes a memory storing a limitation profile. The processor calculates measured position information based on the received laser signals detected by the optical receiver. The processor compares the measured position information to the limitation profile. A disabling trigger occurs when the measured position information exceeds the limitation profile. The limitation profile includes a distance limitation, a velocity limitation, and an angular limitation.

The objective of this invention is to provide a smart laser device that can be used for conference presentations, hunting, recreational time with household pets, and other legitimate uses while preventing detrimental uses such as attempting to blind pilots flying helicopters or commercial fixed wing aircraft.

Further aspects of the invention will become apparent as the following description proceeds and the features of novelty which characterize this invention are pointed out with particularity in the claims annexed to and forming a part of this specification.

BRIEF DESCRIPTION OF THE FIGURES

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 5 depicts a data block containing threshold limits for a laser device;

DETAILED DESCRIPTION

While the invention has been shown and described with reference to a particular embodiment thereof, it will be understood to those skilled in the art, that various changes in form and details may be made therein without departing from the spirit and scope of the invention.

Figure 1:
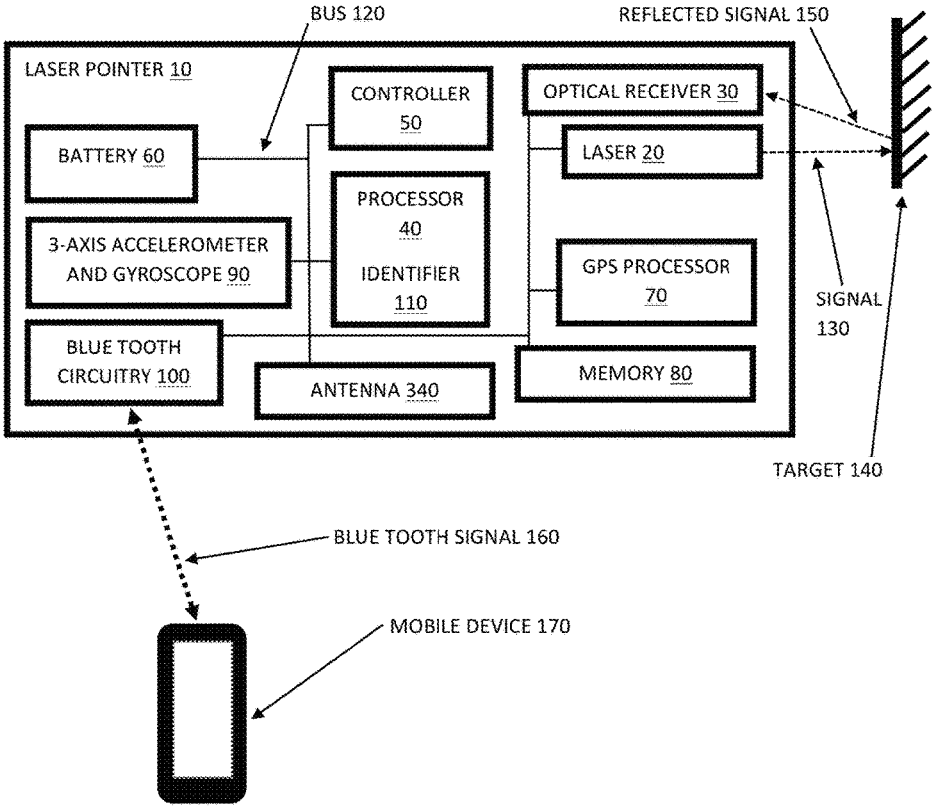
FIG. 1 illustrates a block diagram of a laser device emitting a laser signal at a target and communicating with a mobile device.

FIG. 1 illustrates a block diagram of a laser device 10 emitting a laser signal 130 at a target 140 and communicating with a mobile device 170. Laser device 10 may be a laser pointer, or any commercially available laser based device. Lasers have a variety of legitimate uses such as in astronomical research, deep-space communications, orbital satellite imaging, and outdoor displays to attract and entertain the public. However, the misuse of laser devices poses a serious threat to aviation safety. In order to ensure laser device 10 functions for such legitimate use only, and cannot function for illegitimate uses such as targeting aircraft, laser device 10 is equipped with a variety of components that monitor the operation of laser device 10 that limit it to its legitimate uses. Laser device 10 includes a laser 20 that emits signal 130. Laser device 10 also includes an optical receiver 30, a processor 40 and a controller 50. The laser device in this example is powered by a battery 60, but may be powered by a conventional electrical outlet or other electrical source. Laser device 10 includes a GPS processor 70, memory 80, and 3-axis accelerometer and gyroscope 90. Laser device 10 may also include blue tooth circuitry 100 that enables it to communicate with other devices according to the blue tooth standard. In this case, blue tooth circuitry 100 can transmit and receive blue tooth signals 160 with mobile device 170. Laser device 10 may also include an antenna 340 that can receive RF signals. All of the above listed components are coupled to each other via bus 120. Laser 20 emits signals 130 that are directed at a target 140. When signals 130 strike target 140, they are reflected producing reflected signals 150. Processor 40 includes a unique hard encoded identifier 110 that uniquely identifies processor 40 from all other processors.

Laser 20 emits signals 130 that reflect off of target 140 as reflected signal 150. Optical receiver 30 detects reflected signals 150. Processor 40 and controller 50 control the operation of laser 20. Processor 40 utilizes the information from optical receiver 30 to determine position information of laser pointer 10 relative to target 140. This distance calculation may be determined by a Time Of Flight (TOF) measurement or through the use of interferometry. This position information can include the distance between target 140 and laser pointer 10. Multiple distance measurements over time can provide the relative velocity between target 140 and laser device 10. Processor 40 includes a unique identifier 110 that uniquely identifiers processor 40 from all other processors. Controller 50 and/or processor 40 can control the operation of laser 20 and cause it to encode signal 130 to include digital information. This digital information can include identifier 110. Laser pointer 10 includes GPS processor 70 that identifies the geographic location of laser device 10 with GPS coordinates. Processor 40 and/or controller 50 can control the operation of laser 20 and cause it to encode signal 130 with digital information that includes these GPS coordinates.

Laser device 10 includes 3-axis accelerometer and gyroscope 90 that can determine the relative angle that laser device 10 is emitting signal 130 relative to the Earth. The nature of target 140 will indicate whether it is a legitimate target or illegitimate target. A key illegitimate target is aircraft. Aircraft have distinctive distance and velocity characteristics that distinguish them from legitimate targets such as presentation screens in a conference room, or a playful cat in a living room. These differences in distance and velocity enable processor 40 to distinguish legitimate targets 140 from illegitimate ones based upon the relative distance and velocity information calculated by processor 40 based upon reflected signals 150 received by optical receiver 30. Also, the relative angle that laser device 10 is pointed at target 140 can indicate whether it is a legitimate target 140 or not.

In order to determine whether target 140 is legitimate or illegitimate based upon position information such as distance, velocity, or relative angle, memory 80 stores position threshold limitations that distinguish legitimate targets from illegitimate ones. These position threshold limitations may be stored as a limitation profile based on a single limitation, such as distance, velocity, or angle. In these instances, aircraft are generally regarded to be farther in distance, faster in velocity, and higher in angle than a legitimate target 140, such as a presentation screen in a conference room or a cat on a floor. The limitation profile can become more sophisticated based on two of these parameters, or all three of these parameters. Processor 40 accesses this limitation profile from memory 80 and uses it to compare it to the measured position information as calculated based upon the reflected signals detected by optical receiver 30. If the measured position information is within the bounds of the limitation profile, then controller 50 and processor 40 allow laser 20 to continue to function. If the measured position information is outside of the bounds of the limitation profile, then controller 50 and processor 40 will disable the operation of laser 20. Exceeding the bounds of the limitation profile is a disabling trigger.

Blue tooth circuitry 100, which includes a blue tooth antenna, enables laser device 10 to communicate with mobile device 170 via blue tooth signals. Mobile device 170 can include a mobile application 2000, shown in FIG. 7, that controls the operation of laser device 10. Mobile device 170 can receive signals from a law enforcement agency, such as text messages to a specific cellular phone, that direct mobile application 2000 to automatically communicate a disabling trigger to processor 40 via blue tooth signals 160 instructing processor 40 to shut down laser 20. Antenna 340 is an RF antenna that can receive signals from a law enforcement agency that can direct processor 40 to shut down the operation of laser 20.

Processor 40 may shut down the operation of laser 20 for a finite period of time (T), such as 30 seconds, one minute, two minutes, three minutes, 5 minutes, 10 minutes, 20 minutes, or one hour. These time periods are merely exemplary. Processor 40 may shut down the operation of laser 30 for a finite period of time in the event that the measured position information exceeds the limitation profile. This finite period during which laser 20 cannot operate allows an aircraft to proceed out of range of laser 20 before it can operate again. This temporary period for disabling laser 20 may reflect the fact that laser 20 was inadvertently pointed at an inappropriate target. For example, accidentally pointing laser 20 through a window at a conference room may cause processor 40 to determine that the limitation profile was exceeded and shut down laser 20. However, by waiting a finite period of time (T), processor 40 will reactivate laser 20 for use. A finite period of time (T), such as one minute, would allow an aircraft to travel a substantial distance away from laser device 10, but incur a minor disruption to a presentation or other legitimate use.

Figure 2:
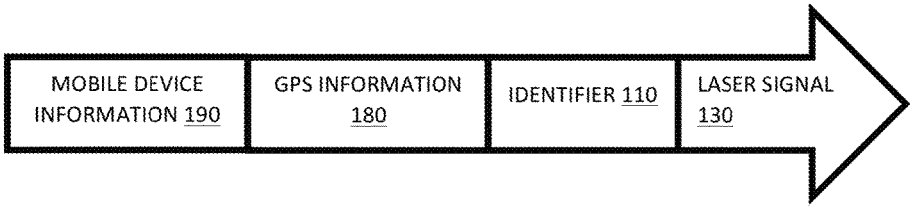
FIG. 2 depicts a laser signal emitting from a laser device that is modulated to include mobile device information, GPS information and an identifier.

FIG. 2 depicts a laser signal 130 emitting from a laser device 10 that is modulated to include mobile device information 190, GPS information 180 and an identifier 110. Laser signal 130 is depicted in FIG. 2 as a series of informational digital data blocks. Photoreceptors can detect laser signal 130 and receive these information digital data blocks that include mobile device information 190, GPS information 180 and an identifier 110. Laser signal 130 may include one of the following three pieces of digital information: mobile device information 190; GPS information 180; and an identifier 110. Alternatively, laser signal 130 may include two of the following three pieces of digital information: mobile device information 190; GPS information 180; and an identifier 110. Alternately, laser signal 130 may include all three of these pieces of digital information: mobile device information 190; GPS information 180; and an identifier 110. Each of these pieces of digital information is provided to assist law enforcement agencies with identifying lasers maliciously directed at aircraft. Airports and flight paths for aircraft can be equipped with various detectors to search for laser signals directed at aircraft. These detectors can be mounted on flying platforms such as helicopters, drones, airplanes, or airships. These detectors can be mounted on fixed ground based platforms such as cell towers, airport control towers, tall buildings, or other platforms. The detector can also be mounted on the aircraft that are the target of the malicious laser signal. When one of these mobile or ground based platforms detects a laser signal aimed at an aircraft, encoding that laser signal with digital information identifying the laser 10, the laser's 10 location, and a mobile device 170 associated with the laser 10 can assist law enforcement agencies with identifying the specific laser device 10 used in the laser attack, identifying the exact GPS location of the laser device 10 used in the attack, and can assist in shutting down the laser device 10 remotely utilizing mobile device information 190. Identifier 110 is a digital identity unique to laser device 10. This identifier may be directly associated with processor 40, or another component of laser device 10. With knowledge of the specific laser 10 that was used in the attack on an aircraft through the reception of identifier 110 information encoded on laser signal 130, law enforcement agencies will have a stronger case for identifying and prosecuting the individual who performed the laser attack on the aircraft, thereby deterring such attacks. Also, law enforcement agencies can send out an RF signal instructing the specific laser device 10 used in the attack to shut down through transmitting an encrypted shut down code to laser device 10 that is received by antenna 340 that includes an encrypted shut down code and identifier 110 so that the specific laser device 10 used in the attack is shut down only. This feature allows for the termination of the laser attack immediately without having law enforcement personnel physically at the place of the attack origin to physically stop the persons engaging in the attack. Encoding laser signal 130 with GPS information 180 can provide law enforcement agencies with the exact location of the laser device 10 in an active attack immediately upon reception of signal 130, thereby enabling law enforcement agencies to rapidly respond and stop the laser attack. Laser signal 130 may also include mobile device information 190. When laser device 10 is coupled to a mobile device 170 so that mobile device 170 controls the operation of laser device 10, mobile device 170 transmits the cellular phone number associated with it to laser device 10. Laser device 10 encodes laser signal 130 with this cellular phone number, which is the mobile device information 190. When laser device 10 is then used in an attack on an aircraft, law enforcement agencies can determine the cellular phone number associated with the mobile device 170 coupled to laser device 10 used in the attack. Law enforcement agencies can then send a text message to mobile device 170 instructing it to shut down operation of the laser pointer 10 automatically. This feature allows for the termination of the laser attack immediately without having law enforcement personnel physically at the place of the attack origin to physically stop the persons engaging in the attack.

Figure 3:
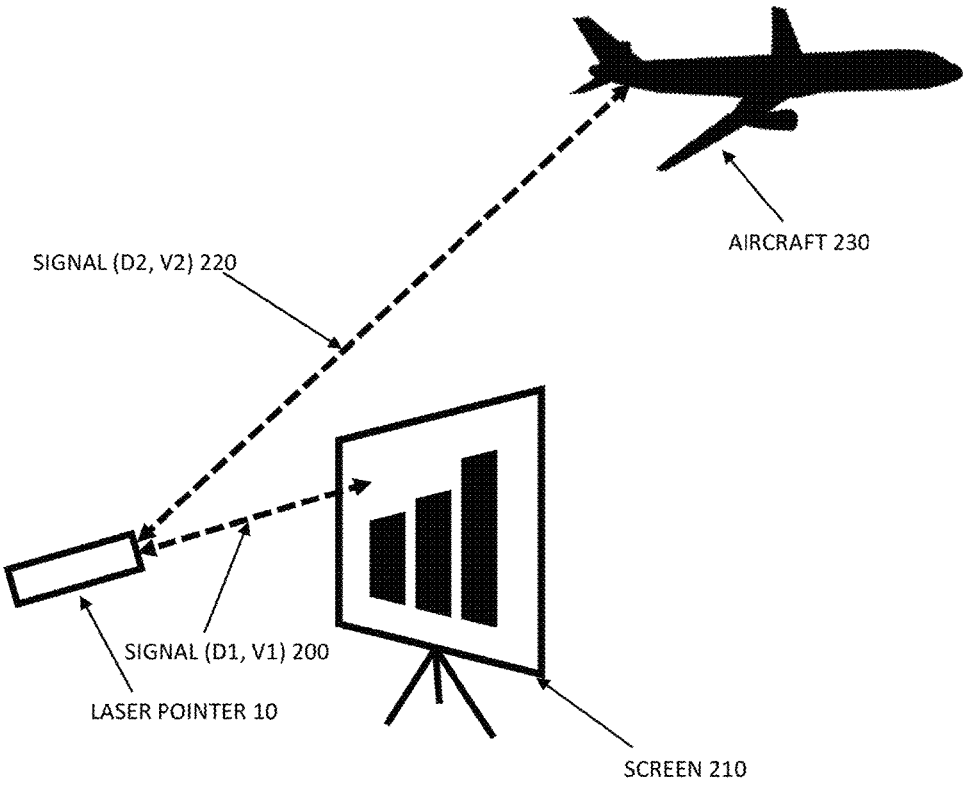
FIG. 3 illustrates a laser device interacting with a presentation display screen and a flying aircraft.

FIG. 3 illustrates a laser device 10 interacting with a presentation display screen 210 and a flying aircraft 230. When laser device 10 is pointed at presentation display screen 210 and emits signal 200, it is engaged in a lawful activity. This lawful use of laser device 10 with presentation display screen 210 is physically characterized by the relative distance D1 and relative velocity V1 between display screen 210 and laser device 10. In this lawful presentation activity, laser device 10 is within a single room of a conference center, school, university, or other room. More than likely, laser device 10 is very close to screen 210 with a relative distance D1 of 5 feet to 10 feet. Typically, this distance D1 will not exceed 100 feet. As screen 210 is stationary, and the user holding laser device 10 is merely walking, the relative velocity V1 will also be relatively small on the order of a few miles per hour, but in all likelihood less than 20 mph. When laser device 10 interacts with aircraft 230 by emitting signal 220 aimed at aircraft 230, the interaction is characterized by the relative distance D2 and velocity V2 between laser device 10 and aircraft 230. Below is Table 1 illustrating various takeoff and landing speeds for common aircraft.

TABLE 1

| Aircraft | Takeoff Speed | Landing Speed |
|---|---|---|
| Boeing 737 | 150 mph | 150 mph |
| Boeing 757 | 160 mph | 160 mph |
| Boeing 747 | 180 mph | 180 mph |
| Airbus A320 | 170 mph | 170 mph |
| Airbus A340 | 180 mph | 180 mph |
| Cessna 150 | 63 mph | 63 mph |

The Federal Aviation Administration (FAA) reports that almost 70% of all incidents occurred when the aircraft is between 2,000 and 10,000 feet altitude, a distance D2 substantially larger than the distance D1 of laser device 10 from screen 210. Further, the (FAA) reports that these incidents commonly occur during takeoff and landing, given the low altitude occurrence of the attacks. As shown by Table 1, large commercial aircraft have takeoff an landing speeds commonly above 150 mph, a velocity V2 well above the relative velocity V1 between laser device 10 and screen 210. Even a propeller driven Cessna 150 has a speed V2 of 63 mph at takeoff and landing, well above velocity V1. Thus, it is possible to differentiate legitimate uses of laser device 10 from illegitimate uses based upon the relative distance D and velocity V calculated by laser device 10 based on reflected signal 150 and signal 130. This differentiation allows for the use of limitation thresholds based on distance and speed to control whether laser device 10 can operate. Safe and lawful uses of laser device 10 are characterized by short distances and low relative speeds. Unlawful and dangerous uses of laser device 10 are characterized by longer distances and higher relative speeds. Processor 40 determines whether to operate laser 20 based on a comparison of these limitation thresholds to measured information based on signal 130 and reflected signal 150.

Figure 4:
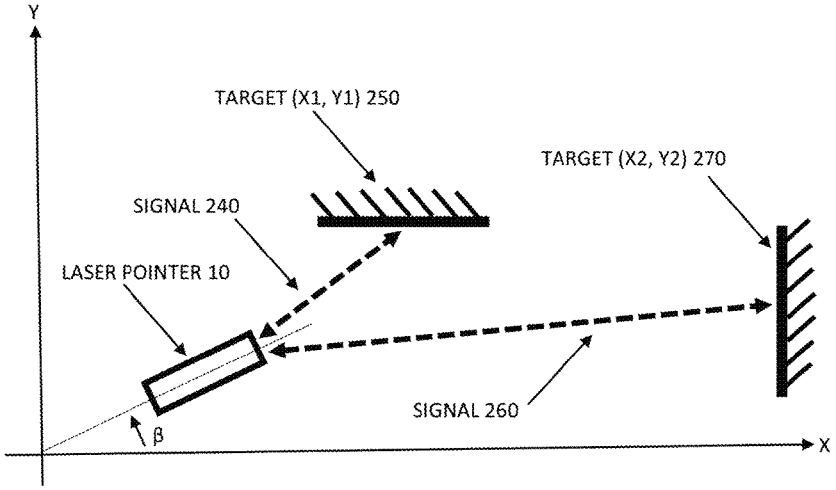
FIG. 4 illustrates a laser device interacting with two different targets at an angle as illustrated on an XY graph.

FIG. 4 illustrates a laser device 10 interacting with two different targets 250 and 270 at an angle as illustrated on an XY graph. The Y-axis represents vertical height and the X-axis represents horizontal length. Laser device 10 measures the distance between laser device 10 and target 250 and 270. Laser device 10 includes 3-axis accelerometer and gyroscope 90 allows processor 40 to determine the relative angle β that laser device 10 is oriented with respect to X-axis, or the Earth. Utilizing relative angle β and the calculated distance to targets 250 and 270, laser pointer 10 and processor 40 can calculate the horizontal and vertical distances of target 250 (X1, Y1) and target 270 (X2, Y2). The use of 3-axis accelerometer and gyroscope 90 allows for a more refined limitation on the operation of laser 10. Conference rooms will typically have longer horizontal lengths with the walls than height between the floor and ceiling. Thus, it is possible to set limitation thresholds that are longer for distance and shorter for height. A room may have a height on the order of 10 or 20 feet. However, aircraft are typically operating at several hundred to a few thousand feet during much of the takeoff and landing.

FIG. 5 depicts a data block 280 containing threshold limits 330 for a laser device 10. These threshold limits 330 include a maximum horizontal distance 290, a maximum vertical distance 300, a maximum velocity 310, and a maximum total distance 320. Processor 40 may use one, two, three, or all four of these threshold limits to determine whether laser 20 can operate. Exceeding any one or more of these threshold limits can cause a disabling trigger in which laser device 10 deactivates laser 20 from operating for a time period (T). The distances shown in FIG. 5 for threshold limits 330 are merely exemplary. Any threshold limit may be used that is capable of distinguishing between the altitude and velocity common of aircraft during approach and landing and the distances and speeds of a person walking in a conference room while pointing at a display screen.

Figure 6:
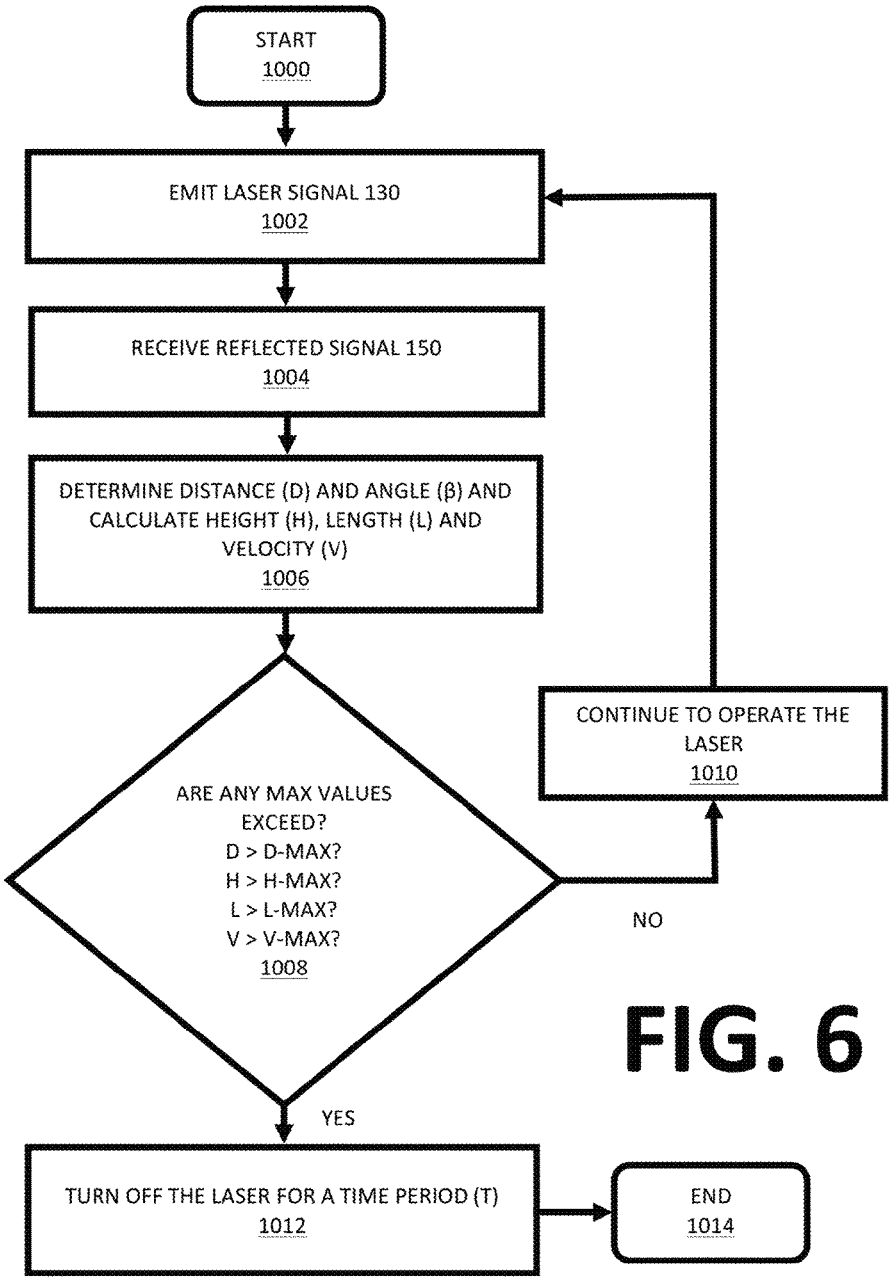
FIG. 6 depicts a flow chart that illustrates a process performed by the processor to determine whether a laser can continue to operate or should be shut down based on a disabling trigger that occurs when measured position information exceeds position information thresholds.

FIG. 6 depicts a flow chart that illustrates a process performed by processor 40 to determine whether a laser 20 can continue to operate or should be shut down based on a disabling trigger that occurs when measured position information exceeds position information thresholds. The flow chart begins with START in process step 1000. In step 1002, laser 20 emits laser signal 130. Laser signal 130 hits target 140, which can be an airplane or a display screen or other target, and reflects off as reflected signal 150. In step 1004, reflected signal 150 is detected and received by optical receiver 30. In step 1006, processor 40 determines the positional information of laser device 10 based on the sent and received laser signals 130 and 150 to calculate the distance, height, horizontal distance (length), and velocity of target 140. Also in step 1006, laser device 10 uses 3-axis accelerometer and gyroscope 90 to determine the relative angle β that laser device 10 is oriented with respect to the Earth. In step 2008, laser device 10 compares the calculated position information distance D, angle β, height H and length L and velocity V and compares them to threshold limitation values stored in memory: D-MAX, H-MAX, L-MAX and V-MAX. If one or more of the comparisons shown in equations EQ1-EQ4 below are false, such that the measured value is below the threshold value limitation, then the laser device 10 can continue to operate in step 1010. If laser device 10 continues to operate in step 1010, the process repeats itself in a constant loop until one or more of the threshold values is exceeded by the measured value. When the threshold value is exceeded by the measured value, processor 40 directs controller 50 to turn off laser 20 for a time period (T) in step 1012. The process then ENDS in step 1014.

| | |
|---|---|
| EQ1: | D > D-MAX? |
| EQ2: | H > H-MAX? |
| EQ3: | L > L-MAX? |
| EQ4: | V > V-MAX? |

Figure 7:
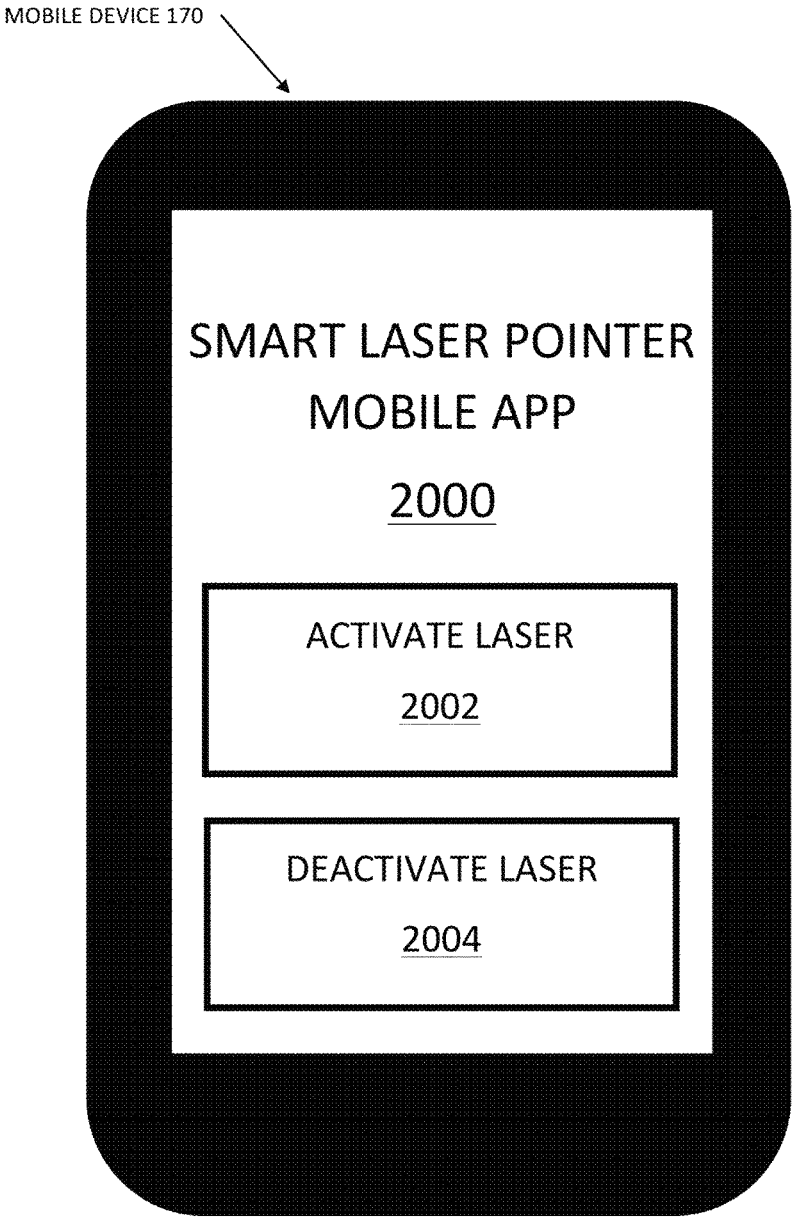
FIG. 7 illustrates a smart laser device mobile app on a mobile device.

FIG. 7 illustrates a smart laser device mobile app 2000 on a mobile device 170. Laser device 10 may be configured such that it only operates when it is in communication with mobile application 2000 on mobile device 170. In order to activate laser device 10, a user will press Graphical User Interface button 2002 on the mobile application 2000. In order to deactivate laser device 10, a user will press the deactivate laser device button 2004 on mobile application 2000. The commands to activate and deactivate laser device 10 by mobile application 2000 are transmitted to laser device 10 via a blue tooth antenna on mobile device 170. When mobile application 2000 sends an activation command to laser device 10, mobile application 2000 transmits the cellular phone number associated with mobile application 2000 to laser device 10 as a part of the activation command. Processor 40 on laser device 10 instructs controller 50 to encode the cellular phone number of mobile device 170 onto the laser signal 130. Thus, if laser device 10 is used in an attack on an aircraft, law enforcement personnel can detect signal 130 or 150, both of which contain the cellular phone number of mobile device 170. Law enforcement personnel can then extract the cellular phone number from the laser signal 130 or 150 and transmit a text command to the mobile device 170 to command mobile application 2000 to instruct laser device 10 to shut down automatically. In this configuration, laser device 10 operates when it is in blue tooth communication with mobile application 2000 only. If laser device 10 loses blue tooth communication with mobile application 2000, laser device 10 shuts down automatically.

Figure 8:
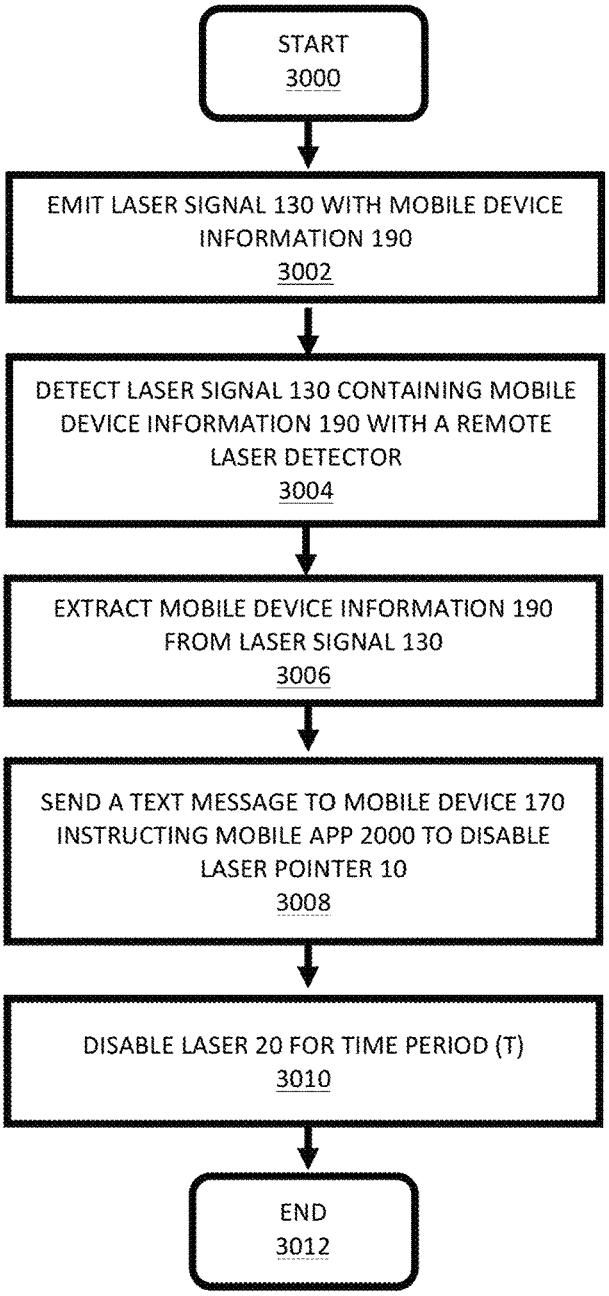
FIG. 8 depicts a flow chart that illustrates a process for disabling a laser device through the use of text messaging and a smart laser device mobile app on a mobile device.

FIG. 8 depicts a flow chart that illustrates a process for disabling a laser device 10 through the use of text messaging and a smart laser device mobile app 2000 on a mobile device 170. The process begins with START 3000. In step 3002, laser signal 130 is emitted from laser device 10 with mobile device information 190 encoded on it by processor 40 and controller 50. The mobile device information 190 is the mobile phone number of mobile device 170. The mobile phone number 190 of mobile device 170 was transmitted to laser device 10 when mobile application 2000 activated laser device 10 over blue tooth based on activation button 2002. In step 3004, a remote sensor detects laser signal 130 containing mobile device information 190. This remote sensor may be any fixed or aerial platform such as a cell phone tower, a tall building, an air traffic control tower, an airplane, a helicopter, an airship, or a drone. The remote sensor extracts mobile device information 190 from laser signal 130, which could also be from reflected laser signal 150, in step 3006. In step 3008, a text message is sent to mobile device 170 over a telecommunications network that instructs mobile app 2000 to disable laser device 10 from operating automatically via a blue tooth command. In step 3010, processor 40 and controller 50 disable laser 20 for a time period (T). This time period (T) may be finite or infinite. The process ends in step 3012 with the disabling of laser 20. Through the process depicted in FIG. 8, law enforcement can remotely deactivate laser 10 from operating through a text message sent over a telecommunications network immediately upon detection of laser signal 130 or 150.

Figure 9:
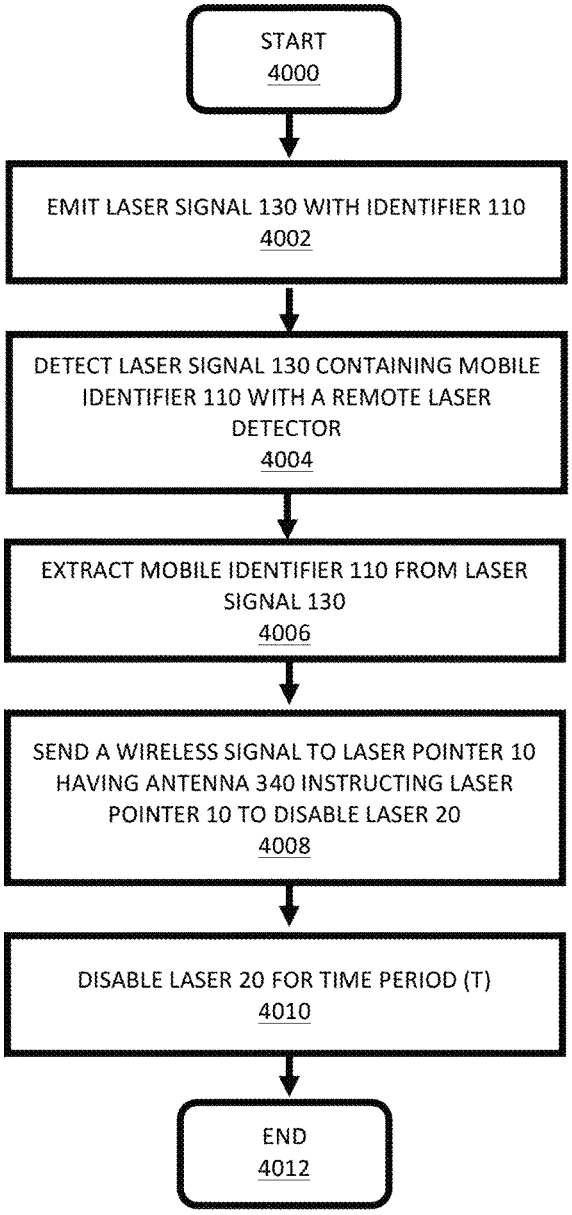
FIG. 9 depicts a flow chart that illustrates a process for disabling a laser device through the use of an RF signal.

FIG. 9 depicts a flow chart that illustrates a process for disabling a laser device 10 through the use of an RF signal. The process begins with step 4000. In step 4002, a laser signal 130 is emitted from laser device 10 that is encoded with digital information that includes identifier 110. Processor 40 and controller 50 operate laser 20 to emit signal 130 that includes digital information such as identifier 110. In step 4004, laser signal 130 or 150 is detected by a remote sensor. This remote sensor may be any fixed or aerial platform such as a cell phone tower, a tall building, an air traffic control tower, an airplane, a helicopter, an airship, or a drone. The remote sensor extracts identifier 110 from laser signal 130 or 150 in step 4006. In step 4008, law enforcement sends a wireless RF signal to laser pointer 10 that is received by antenna 340. This wireless RF signal instructs laser pointer 10 to disable laser 20. The wireless RF signal includes digital information such as identifier 110 and a disabling instruction code. In step 4010, processor 40 and controller 50 automatically disable laser 20 for a time period (T). The process ends in step 4012. Through the process depicted in FIG. 9, law enforcement can remotely deactivate laser 10 from operating through a RF disabling signal immediately upon detection of laser signal 130 or 150.

Figure 10:
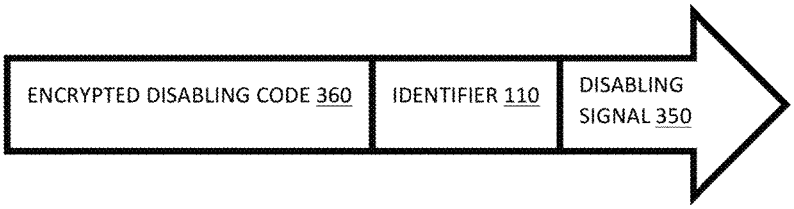
FIG. 10 depicts a disabling signal received by a laser device that includes an encrypted disabling code and an identifier.
Figure 11:
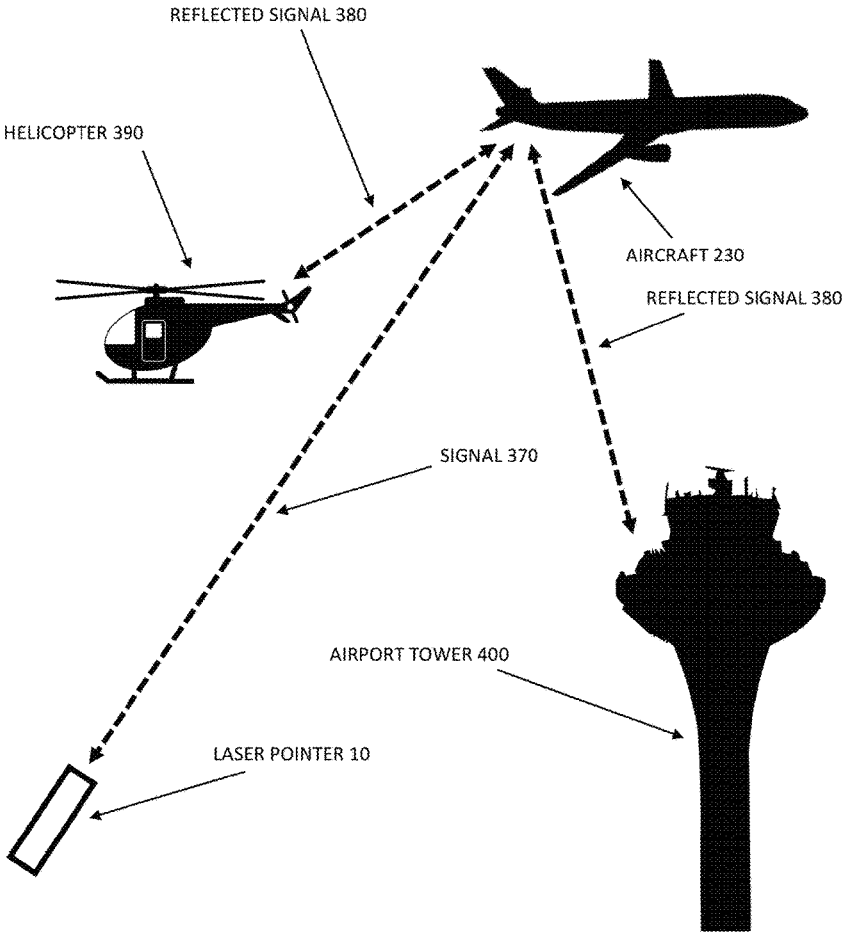
FIG. 11 illustrates a signal being emitted from a laser device that includes identifier data and/or GPS data that is being reflected off of a commercial aircraft and detected by a law enforcement helicopter and an airport control tower.

FIG. 10 depicts a disabling signal 350 received by a laser device 10 that includes an encrypted disabling code 360 and an identifier 110. Disabling signal 350 is transmitted wireless via an RF signal to laser device 10 to instruct processor 40 and controller 50 to disable laser 20 from operating. Disabling signal 350 is received by antenna 340. Disabling signal 350 is a digital signal that includes an encrypted disabling code 360 that instructs processor 40 and controller 50 to disable laser 20 from operating. Disabling signal 350 includes identifier 110 so that the laser device 10 that is targeting the aircraft is the only one that is disabled, and not any other laser devices 10. FIG. 11 illustrates a signal 370 being emitted from a laser device 10 that includes digital information such as identifier data 110, mobile phone data 190, and/or GPS data 180. Signal 370 is being reflected off of a commercial aircraft 230 and detected by a law enforcement helicopter 390 and an airport control tower 400. Law enforcement helicopter 390 and airport control tower 400 are equipped with laser sensors to detect reflected signal 380 and extract the digital information to use in shutting down and locating laser device 10. Aircraft 230 may also be equipped with laser sensors to detect reflected signal 380 and extract the digital information to use in shutting down and locating laser device 10.

Figure 12:
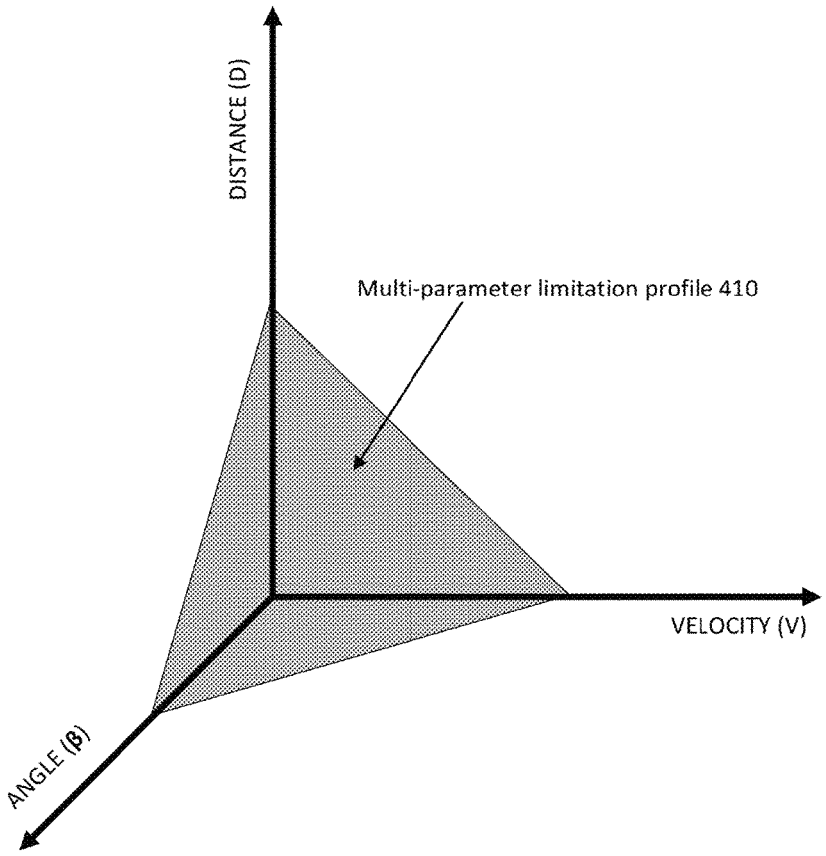
FIG. 12 illustrates a graphical representation of a multi-parameter limitation profile for controlling operation of the laser device.

FIG. 12 illustrates a graphical representation of a multi-parameter limitation profile 410 for controlling operation of the laser device 10. In this case, three parameters define multi-parameter limitation profile 410: distance (D), velocity (V) and angle (n). Memory 80 can be encoded with parameters that define legitimate uses of laser device 10. For instance, use of laser device 10 for corporate presentations in a conference room will have a distance of less than 100 feet, a velocity of less than 10 mph, and an angle less than 60 degrees. A disabling trigger may occur when any one, two or all three of these parameters is exceeded. Alternatively, laser device 10 may be used for astronomical purposes in which case distance may be more than 20 miles, speed may be exactly the rotational velocity of the Earth, and the angle may vary. A disabling trigger may occur when any one, two or all three of these parameters varies outside of these parameters. Exemplary ranges for threshold limitations are provided below in Table 2.

TABLE 2

| Threshold Limit Ranges for certain uses | Max Horizontal Threshold Limit (L-MAX) | Max Vertical Threshold Limit (H-MAX) | Max Velocity Threshold Limit (V-MAX) | Max Distance Threshold Limit (D-MAX) | Max Angular Threshold Limit (β-MAX) |
|---|---|---|---|---|---|
| Conference Rooms | 50 ft.-300 ft. | 20 ft.-200 ft. | 1.0 mph-50 mph | 50 ft.-300 ft. | 60 degrees |
| Astronomy | NA | >20 miles | Equal to Earth's rotation | >20 miles | NA |
| Pet Toys | 50 ft.-300 ft. | 20 ft.-200 ft. | 1.0 mph-50 mph | 50 ft.-300 ft. | 60 degrees |

The system of FIG. 1 may not be needed to be integrated on every laser device 10. The FAA reports that 91% of aircraft illuminations by handheld lasers are primarily green. Also the larger the output power of the laser pointer, the larger the potential for harm to pilots. Thus, there may be a minimum wattage requirement to separate low powered cat toys from lasers capable of blinding pilots.

While the invention has been shown and described with reference to a particular embodiment thereof, it will be understood to those skilled in the art, that various changes in form and details may be made therein without departing from the spirit and scope of the invention.

I claim:

[1. A laser device, comprising:

a laser; and a processor coupled to said laser, wherein said processor disables said laser from operating for a period of time (T) based on a disabling trigger that occurs when said laser is pointed at an aircraft.]

[2. The laser device of claim 1, further comprising:

an optical receiver coupled to said processor, said optical receiver detects received laser signals that are emitted from said laser after they are reflected off of a target; and a memory storing position information threshold limits, wherein said processor calculates measured position information based on the received laser signals detected by said optical receiver, wherein said processor compares said measured position information to said position information threshold limits, wherein said disabling trigger occurs when said position information exceeds said position information threshold limits.]

[3. The laser device of claim 2, wherein said position information threshold limits are a distance limitation, wherein said measured position information is a measured distance, wherein said disabling trigger occurs when said measured distance exceeds said distance limitation.]

[4. The laser device of claim 3, further comprising a 3-axis accelerometer and gyroscope from which said processor can determine an angular position of said laser device with respect to Earth, wherein said distance limitation is a height limitation, wherein said measured distance is a measured height calculated from said measured position information and said angular position, wherein said disabling trigger occurs when said measured height exceeds said height limitation.]

[5. The laser device of claim 3, further comprising a 3-axis accelerometer and gyroscope from which said processor can determine an angular position of said laser device with respect to Earth, wherein said distance limitation is a length limitation, wherein said measured distance is a measured length calculated from said measured position information and said angular position, wherein said disabling trigger occurs when said measured length exceeds said length limitation.]

[6. The laser device of claim 2, wherein said position information threshold limits are a velocity limitation, wherein said measured position information is a measured velocity, wherein said disabling trigger occurs when said measured velocity exceeds said velocity limitation.]

[7. The laser device of claim 1, further comprising an antenna coupled to said processor, wherein said antenna receives a disabling signal from a third party containing said disabling trigger.]

[8. The laser device of claim 7, further comprising an identifier embedded in said processor uniquely identifying said processor, wherein said processor modulates said laser to emit a signal containing said identifier, wherein said disabling signal includes said identifier, thereby allowing the third party to uniquely identify and shut down said laser device through said disabling signal.]

[9. The laser device of claim 8, wherein said disabling signal further includes an encrypted instruction code directing said processor to disable said laser.]

[10. The laser device of claim 9, wherein said antenna is an RF antenna.]

[11. The laser device of claim 7, further comprising a mobile application on a mobile device configured to communicate with said processor through said antenna, wherein said antenna is a blue tooth antenna, wherein said processor enables said laser to function based upon an enabling trigger received by said processor through said blue tooth antenna transmitted from said mobile device under the direction of said mobile application.]

[12. The laser device of claim 11, wherein said enabling trigger includes a mobile telephone number associated with said mobile device, wherein said processor modulates said laser to transmit said mobile telephone number, wherein said disabling trigger is a disabling signal transmitted by said mobile device to said processor through said blue tooth antenna, wherein said mobile app automatically directs said mobile device to transmit said disabling signal after said mobile device receives a text message from a third party containing an encrypted security code directing the mobile device to disable the laser.]

[13. The laser device of claim 1, further comprising a GPS chip coupled to said processor, said GPS chip detects a precise geographic location of said laser device, wherein said processor encodes said precise geographic location on a laser signal emitted by said laser to enable a third party to determine the location of said laser device based upon said laser signal.]

[14. The laser device of claim 3, wherein said distance limitation is set to a size configuration of a large conference room.]

[15. The laser device of claim 6, wherein said velocity limitation is set of a velocity less than the speed of commercial aircraft during take-off or an approach and landing from an airport.]

[16. The laser device of claim 1, wherein said period of time (T) is greater than 30 seconds to enable a commercial aircraft to travel a safe distance away from said laser device before said processor reactivates said laser to function.]

[17. The laser device of claim 1, wherein said period of time (T) is greater than one minute to enable a commercial aircraft to travel a safe distance away from said laser device before said processor reactivates said laser to function.]

[18. The laser point of claim of claim 1, wherein said period of time (T) is indefinite.]

[19. The laser device of claim 1, further comprising:

an optical receiver coupled to said processor, said optical receiver detects received laser signals that are emitted from said laser after they are reflected off of a target;

a 3-axis accelerometer and gyroscope from which said processor can determine an angular position of said laser device with respect to Earth; and a memory storing a limitation profile, wherein said processor calculates measured position information based on the received laser signals detected by said optical receiver, wherein said processor compares said measured position information to said limitation profile, wherein said disabling trigger occurs when said measured position information exceeds said limitation profile.]

[20. The laser device of claim 19, wherein said limitation profile includes a distance limitation, a velocity limitation, and an angular limitation.]

*21. A laser device, comprising:*

*a laser emitting a laser signal;*

*a processor coupled to the laser; and*

*an optical receiver coupled to the processor, the optical receiver detects the laser signal after it is reflected off of a target, the processor determines a measured velocity of the target relative to the laser device based on the reflected laser signal, wherein the processor disables the laser from operating for a period of time (T) based*

*on a disabling trigger that occurs when the measured velocity exceeds a velocity threshold limit.*

*22. The laser device of claim 21, further comprising a 3-axis accelerometer and gyroscope from which the processor can determine an angular position of the laser device with respect to Earth, wherein the processor calculates a measured height based on the reflected laser signal and the angular position, wherein the disabling trigger further comprises the measured height exceeding a height threshold limit.*

*23. The laser device of claim 22, wherein the period of time (T) is at least 30 seconds, or at least 1 minute.*

*24. The laser device of claim 23, wherein the laser is a green laser.*

*25. The laser device of claim 21, wherein the velocity limitation is at least 50 mph.*

*26. The laser device of claim 21, further comprising:*

*an antenna coupled to the processor; and*

*an identifier uniquely identifying the laser device, wherein the processor modulates the laser to emit a signal containing the identifier, wherein the processor disables the laser for a period of time (t) when the antenna receives a disabling signal from a third party containing the identifier extracted from the laser signal.*

*27. The laser device of claim 26, further comprising a GPS chip coupled to the processor, the GPS chip detects a geographic location of the laser device, wherein the processor encodes the geographic location on the laser signal emitted by the laser to enable a third party to determine the location of the laser device based upon the laser signal.*

*28. A laser device, comprising:*

*a laser emitting a laser signal;*

*a processor coupled to the laser; and*

*an optical receiver coupled to the processor, the optical receiver detects the laser signal after it is reflected off of a target, the processor determines a measured altitude of the target using the reflected laser signal, wherein the processor disables the laser from operating for a period of time (T) based on a disabling trigger that occurs when the measured altitude exceeds an altitude threshold limit.*

*29. The laser device of claim 28, further comprising a 3-axis accelerometer and gyroscope from which the processor can determine an angular position of the laser device with respect to Earth, wherein the processor calculates the measured altitude using the reflected laser signal and the angular position.*

*30. The laser device of claim 29, further comprising a GPS chip coupled to the processor, the GPS chip detects a geographic location of the laser device, wherein the processor calculates the measured altitude using the reflected laser signal, the angular position, and the geographic location of the laser device.*

*31. A laser device, comprising:*

*a laser emitting a laser signal;*

*a processor coupled to the laser;*

*an antenna coupled to the processor; and*

*an identifier uniquely identifying the laser device, wherein the processor modulates the laser to emit a signal containing the identifier, wherein the processor disables the laser for a period of time (t) when the antenna receives a disabling signal from a third party containing the identifier extracted from the laser signal.*

*32. The laser device of claim 31, wherein the disabling signal further includes an encrypted instruction code directing the processor to disable the laser.*

*33. The laser device of claim 32 wherein the antenna is an RF antenna.*

*34. The laser device of claim 33, further comprising a mobile application on a mobile device configured to communicate with the processor through the antenna, wherein the antenna is a blue tooth antenna, wherein the processor enables the laser to function based upon an enabling trigger received by the processor through the blue tooth antenna transmitted from the mobile device under the direction of the mobile application.*

*35. The laser device of claim 34, wherein the enabling trigger includes a mobile telephone number associated with the mobile device, wherein the processor modulates the laser to transmit the mobile telephone number on the laser signal, wherein the disabling trigger is a disabling signal transmitted by the mobile device to the processor through the blue tooth antenna, wherein the mobile application automatically directs the mobile device to transmit the disabling signal after the mobile device receives a text message from a third party containing an encrypted security code directing the mobile device to disable the laser.*

*36. The laser device of claim 35, further comprising a GPS chip coupled to the processor, the GPS chip detects a geographic location of the laser device, wherein the processor encodes the geographic location on the laser signal emitted by the laser to enable a third party to determine the location of the laser device based upon the laser signal.*

*37. The laser device of claim 36, wherein the period of time (t) is at least 30 seconds, or at least 1 minute.*

*38. The laser device of claim 37, wherein the laser is a green laser.*

*39. The laser device of claim 38, further comprising:*

*an optical receiver coupled to the processor, the optical receiver detects the laser signal after it is reflected off of a target, the processor determines measured position information of the target relative to the laser device based on the reflected laser signal, wherein the processor disables the laser from operating for a period of time (T) based on a disabling trigger that occurs when the measured position information exceeds a position threshold limit.*

*40. The laser device of claim 39, further comprising a 3-axis accelerometer and gyroscope from which the processor can determine an angular position of the laser device with respect to Earth, wherein the position threshold limit is a multi-parameter limitation profile comprising a velocity limitation, a distance limitation, and an angular limitation, wherein the multi-parameter limitation profile is stored in a memory, wherein the disabling trigger occurs when one, two or three of the limitations in the multi-parameter limitation profile are exceeded by the measured position information.*

*41. A laser device, comprising:*

*a laser emitting a laser signal;*

*a processor coupled to the laser; and*

*an optical receiver coupled to the processor, the optical receiver detects the laser signal after it is reflected off of a target, the processor determines a measured distance of the target relative to the laser device based on the reflected laser signal, wherein the processor disables the laser from operating for a period of time (T) based on a disabling trigger that occurs when the measured distance exceeds a distance threshold limit.*

*42. The laser device of claim 41, further comprising a 3-axis accelerometer and gyroscope from which the processor can determine an angular position of the laser device with respect to Earth, wherein the processor calculates a measured height based on the reflected laser signal and the*

*angular position, wherein the disabling trigger further comprises the measured height exceeding a height threshold limit.*

*43. The laser device of claim 42, wherein the processor determines a measured velocity of the target relative to the laser device based on the reflected laser signal, wherein the disabling trigger further comprises the measured velocity exceeding a velocity threshold limit.*

*44. The laser device of claim 43, wherein the period of time (T) is at least 30 seconds, or at least 1 minute.*

* * * * *